(12) United States Patent
Anastas

(10) Patent No.: US 8,013,847 B2
(45) Date of Patent: Sep. 6, 2011

(54) MAGNETIC ACTUATOR FOR PROVIDING HAPTIC FEEDBACK

(75) Inventor: George V. Anastas, Can Carlos, CA (US)

(73) Assignee: Immersion Corporation, San Jose, CA (US)

( * ) Notice: Subject to any disclaimer, the term of this patent is extended or adjusted under 35 U.S.C. 154(b) by 2051 days.

(21) Appl. No.: 10/924,674

(22) Filed: Aug. 24, 2004

(65) Prior Publication Data

US 2006/0044271 A1 Mar. 2, 2006

(51) Int. Cl.
*H01F 7/06* (2006.01)
(52) U.S. Cl. ........................................................ 345/184
(58) Field of Classification Search .................. 345/156, 345/161, 169, 184; 188/161, 163; 335/285, 335/288–294
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,795,150 A | 3/1974 | Eckhardt | |
| 3,902,687 A | 9/1975 | Hightower | |
| 3,903,614 A | 9/1975 | Diamond et al. | |
| 4,160,508 A | 7/1979 | Frosch et al. | |
| 4,175,650 A | 11/1979 | Miller | |
| 4,206,837 A | 6/1980 | Brown et al. | |
| 4,236,325 A | 12/1980 | Hall et al. | |
| 4,262,240 A | 4/1981 | Arai | |
| 4,296,851 A | 10/1981 | Pierce | |
| 4,400,790 A | 8/1983 | Chambers et al. | |
| 4,513,235 A | 4/1985 | Acklam et al. | |
| 4,553,080 A | 11/1985 | Cannon et al. | |
| 4,560,983 A | 12/1985 | Williams | |
| 4,581,491 A | 4/1986 | Boothroyd | |
| 4,599,070 A | 7/1986 | Hladky et al. | |
| 4,643,282 A | 2/1987 | Edl | |
| 4,652,805 A * | 3/1987 | Kohn | 318/628 |
| 4,706,294 A | 11/1987 | Ouchida | |
| 4,708,656 A | 11/1987 | De Vries et al. | |
| 4,713,007 A | 12/1987 | Alban | |
| 4,718,529 A | 1/1988 | Kroeger et al. | |
| 4,758,165 A | 7/1988 | Tieman et al. | |
| 4,823,106 A | 4/1989 | Lovell | |
| 4,859,922 A | 8/1989 | Tauchenitz et al. | |
| 4,868,549 A | 9/1989 | Affinito et al. | |

(Continued)

FOREIGN PATENT DOCUMENTS

EP 0111992 6/1984

(Continued)

OTHER PUBLICATIONS

U.S. Appl. No. 10/902,462, Olien.

(Continued)

*Primary Examiner* — Chanh Nguyen
*Assistant Examiner* — Allison Walthall
(74) *Attorney, Agent, or Firm* — Kilpatrick Townsend & Stockton LLP

(57) ABSTRACT

Apparatus for providing haptic feedback are described. One described apparatus comprises a braking surface, an electromagnet core disposed in the braking surface, a disk operable to contact the braking surface such that a gap is defined between the disk and the braking surface, and a damping material disposed within the gap.

25 Claims, 5 Drawing Sheets

U.S. PATENT DOCUMENTS

| | | |
|---|---|---|
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,059,842 A | 10/1991 | Uehara |
| 5,078,152 A | 1/1992 | Bond |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan |
| 5,492,312 A | 2/1996 | Carlson |
| 5,542,672 A | 8/1996 | Meredith |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishiijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,894,263 A * | 4/1999 | Shimakawa et al. ....... 340/388.1 |
| 5,914,705 A | 6/1999 | Johnson et al. |
| 5,944,151 A | 8/1999 | Jakobs et al. |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A | 11/2000 | Levin et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1 * | 9/2001 | Carlson et al. ............. 188/267.1 |
| 6,307,285 B1 | 10/2001 | Delson et al. |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,710,979 B2 | 3/2004 | Garrigues et al. |
| 7,089,292 B1 * | 8/2006 | Roderick et al. ............... 345/156 |
| 2001/0035854 A1 * | 11/2001 | Rosenberg et al. ........... 345/156 |
| 2001/0052893 A1 | 12/2001 | Jolly et al. |
| 2001/0055002 A1 * | 12/2001 | Endo ............................ 345/156 |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0040800 A1 | 3/2004 | Anastas et al. |

FOREIGN PATENT DOCUMENTS

| | | |
|---|---|---|
| EP | 0349086 | 1/1990 |
| EP | 0640902 A2 | 3/1995 |
| JP | H2-185278 | 7/1990 |
| JP | H4-8381 | 1/1992 |
| JP | H5-192449 | 8/1993 |
| JP | H7-24147 | 1/1995 |
| WO | WO 03081623 A1 * | 10/2003 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System For The Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. On Haptic Interfaces for Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337, 1989.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies, May 1995.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine the Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive© Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

MAGNETIC ACTUATOR FOR PROVIDING HAPTIC FEEDBACK

FIELD OF THE INVENTION

The present invention generally relates to haptic devices. The present invention more particularly relates to an apparatus comprising a magnetic actuator for providing haptic feedback.

BACKGROUND OF THE INVENTION

The range of applications for actuators covers many technical areas. Actuators may be used as system components for moving or steering local system parts for controlling system processes. In some systems, actuators may be used to provide haptic feedback to a system user. Haptic feedback generated by actuators can increase the amount of information available to a system user by providing an additional medium through which to transfer system information.

Actuators utilized for generating haptic feedback may comprise resistive actuators. Resistive actuators can be mechanical or magnetic in nature. Magnetic resistive actuators can comprise a closed magnetic circuit including a pot-core style electromagnet and a target contacting the electromagnet that completes the magnetic circuit. E- and C-core style magnets may additionally be used in resistive actuators. Friction forces are created from the normal forces produced by the electromagnet. When used as a component of an apparatus or system, the haptic resistance provided by the magnetic actuator can be correlated with specific apparatus or system information in response to user input.

SUMMARY OF THE INVENTION

Embodiments of the present invention comprise a magnetic actuator for providing haptic feedback. In one embodiment of the present invention, an apparatus comprises a braking surface, an electromagnet core disposed in the braking surface, a disk operable to contact the braking surface such that a gap is defined between the disk and the electromagnet core, and a damping material disposed within the gap.

This example embodiment is mentioned not to limit or define the invention, but to provide example of an embodiment of the invention to aid understanding thereof. Example embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
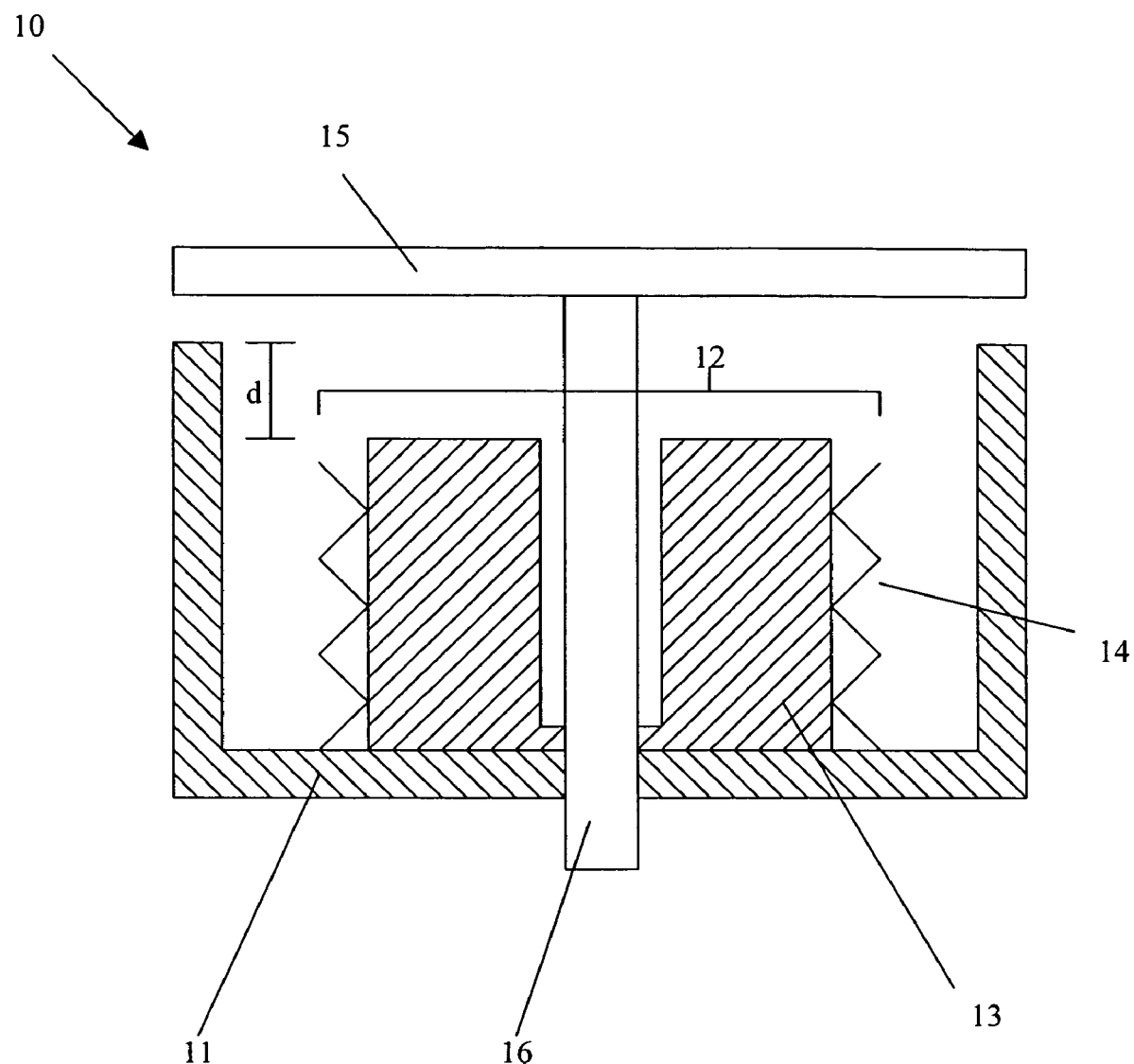
FIG. 1 illustrates a cross-sectional view of an apparatus according to one embodiment of the present invention.

Embodiments of the present invention comprise magnetic actuators for providing haptic feedback. Referring now to the drawings in which like numerals indicate like elements throughout the several figures, FIG. 1 illustrates a cross-sectional view of an apparatus according to one embodiment of the present invention. The apparatus 10 comprises a braking surface and an electromagnet core 12 disposed in the braking surface. The braking surface comprises a first cylinder 11 having a first length and an open end and a closed end. In other embodiments, the first cylinder 11 of the braking surface may comprise other various geometries such as elliptical, square, rectangular, or polygonal.

The electromagnet core 12 comprises a second cylinder 13 having a second length, which is disposed in the first cylinder 11 of the braking surface. The electromagnet core 12 comprises an electrical field coil 14 in communication with the second cylinder 13. In other embodiments, the electrical field coil 14 is not in communication with the second cylinder 13 and may reside in the annular space between the first cylinder 11 and second cylinder 13. The electrical field coil 14 enables electromagnetic function. The length of the first cylinder 11 is greater than the length of the second cylinder 13 such that the difference between the length of the first cylinder 11 and the length of the second cylinder 13 is equal to a value "d." In some embodiments, the first cylinder 11 and second cylinder 13 comprise the same length of magnetic material wherein a coating may be applied to the first cylinder 11 to provide the first cylinder 11 with a greater length than the second cylinder 13.

The apparatus 10 displayed in FIG. 1 additionally comprises a disk 15 in communication with a shaft 16. The shaft 16 of the apparatus 10 passes through the second cylinder 13 of the electromagnet core 12 and the closed end of the first cylinder 11 of the braking surface. The disk 15 and shaft 16 are operable to move rotationally and axially. In one embodiment, the disk 15 may comprise a manipulandum for interfacing with an apparatus 10 user. When rotated a predetermined amount by a user, the disk 15 may be operable to move in the axial direction and contact the top surface of the first cylinder 11 of the braking surface. In other embodiments an annular shaft may pass outside of the electromagnet core, or the shaft may be positioned on one side of the electromagnet.

Figure 2:
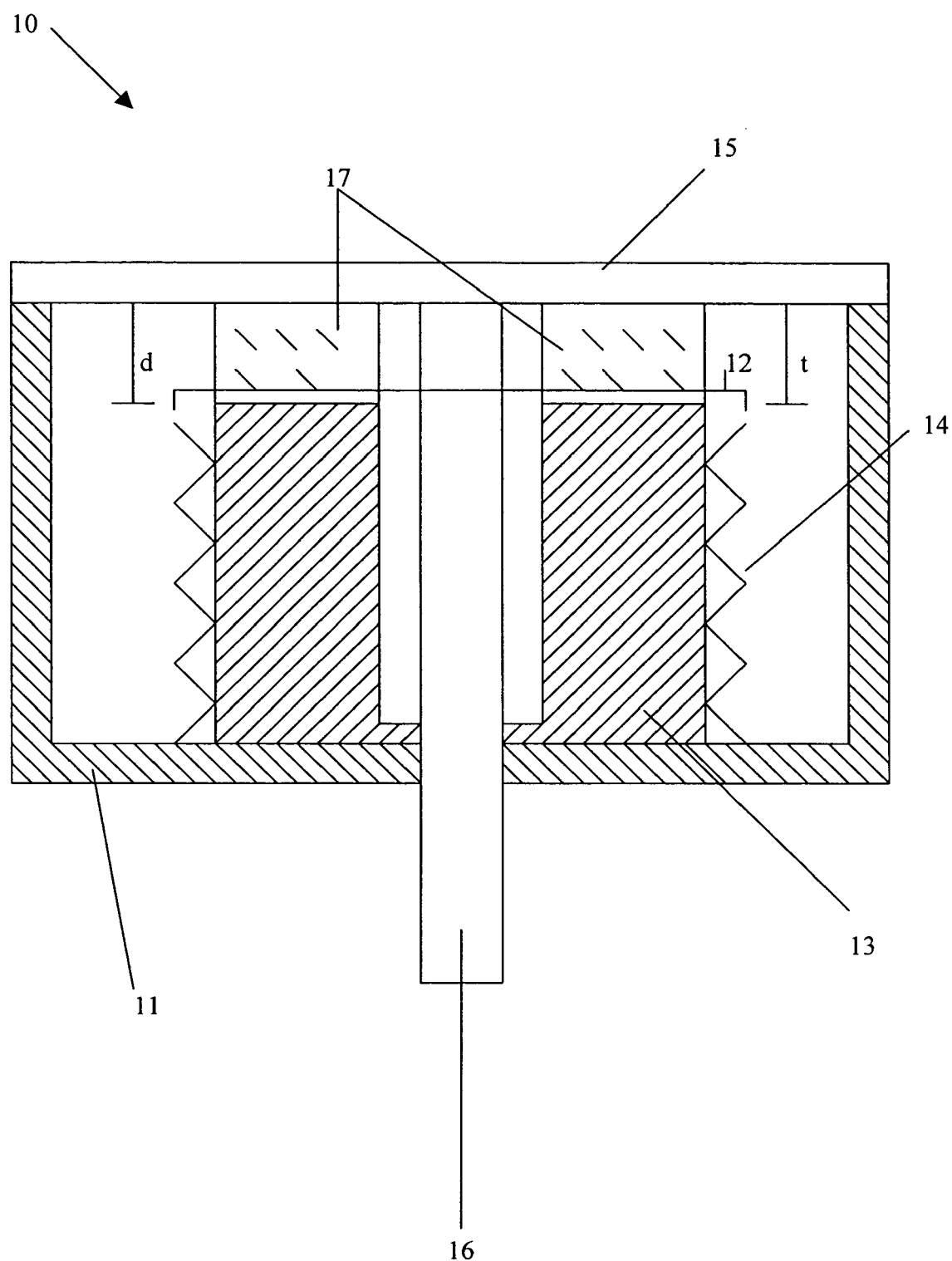
FIG. 2 illustrates a cross-sectional view of an apparatus according to one embodiment of the present invention.

FIG. 2 illustrates the apparatus 10 wherein the disk 15 is in contact with the first cylinder 11 of the braking surface. The contact of the disk 15 with the first cylinder 11 of the braking surface provides haptic feedback to an apparatus 10 user through resistance to rotational motion. Moreover, when the disk 15 contacts the first cylinder 11 of the braking surface, a gap of distance "d" is formed between the top surface of the second cylinder 13 of the electromagnet core 12 and the bottom surface of the disk 15. The formation of the gap results from the length of the braking surface comprising the first cylinder 11 being greater than the length of the electromagnet core 12 comprising the second cylinder 13. In other embodiments, the disk 15 does not contact the first cylinder 11 of the braking surface in providing haptic feedback through resistance to rotational motion. In these embodiments, a magnetically generated force between the disk 15 and the electromagnet provides sufficient resistance to rotational motion to provide a haptic effect.

Magnetic actuators that provide haptic feedback by resisting rotary action may produce noise during rotational operation. In some instances, noise produced by the magnetic actuator under rotation may be caused by the metallic grains of the actuator brake disk "bouncing" over the grains of the electromagnet core. This noise produced by magnetic actuators during rotational operation can be objectionable to a user and may be corrected by magnetic actuators in embodiments of the present invention.

A damping material 17 may be disposed in the gap created by the contact of the disk 15 with the first cylinder 11 of the braking surface. The damping material 17 is operable to dissipate any noise resulting from the rotational operation of the apparatus 10. In the embodiment shown in FIG. 2, the damping material 17 is in communication with both the top surface of the second cylinder 13 of the electromagnet core 12 and the bottom surface of the brake disk 15. In embodiments wherein the disk 15 does not make contact with the braking surface and resistance to rotational motion is provided by magnetic forces alone, a damping material may be disposed between the electromagnet core and disk 15.

The damping material 17 in communication with the electromagnet core 12 in FIG. 2 is of a thickness "t" wherein the value of t is substantially equal to the value of d, the distance of the gap. As a result, the damping material in communication with the electromagnetic core 12 is operable to contact the bottom surface of the brake disk 15. In other embodiments, the value of t may be less than the value of d.

Damping materials suitable for use with the present invention may demonstrate physical properties such as resistance to shear, compositional homogeneity, and advantageous viscosity-temperature characteristics. Moreover, damping materials suitable for use with the present invention may be chemically inert and/or resistant to oxidation. An example of a damping material suitable for use with the present invention may be a damping grease. Damping greases may be obtained from Nye Lubricants, Inc., 12 Howland Road, Fairhaven, Mass. 02719. Other damping materials suitable for use with the present invention may comprise silicone gels or compliant pads constructed of substances such as rubber and/or other polymeric materials.

In some embodiments, the damping material 17 disposed in the gap created by the contact of the disk 15 with the first cylinder 11 may comprise a fibrous washer in conjunction with a grease. In one embodiment, for example, the fibrous washer may be in communication with the top of the second cylinder 13 of the electromagnet core 12, and a grease is situated on the top of the fibrous washer. The grease on top of the fibrous washer is in communication with the bottom of the disk 15. In another embodiment, the fibrous washer may be between a bottom layer of grease and a top layer of grease. The bottom layer of grease may be in communication with the top of the second cylinder 13 of the electromagnet core 12 while the top layer of grease may be in communication with the bottom of the disk 15. In another embodiment, the fibrous washer may be in communication with the bottom of the disk 15, and a grease is situated below the fibrous washer. The grease may be in communication with the second cylinder 13 of the electromagnet core 12. In the embodiments comprising a fibrous washer, the grease may be interchangeable with a silicone gel.

Figure 3:
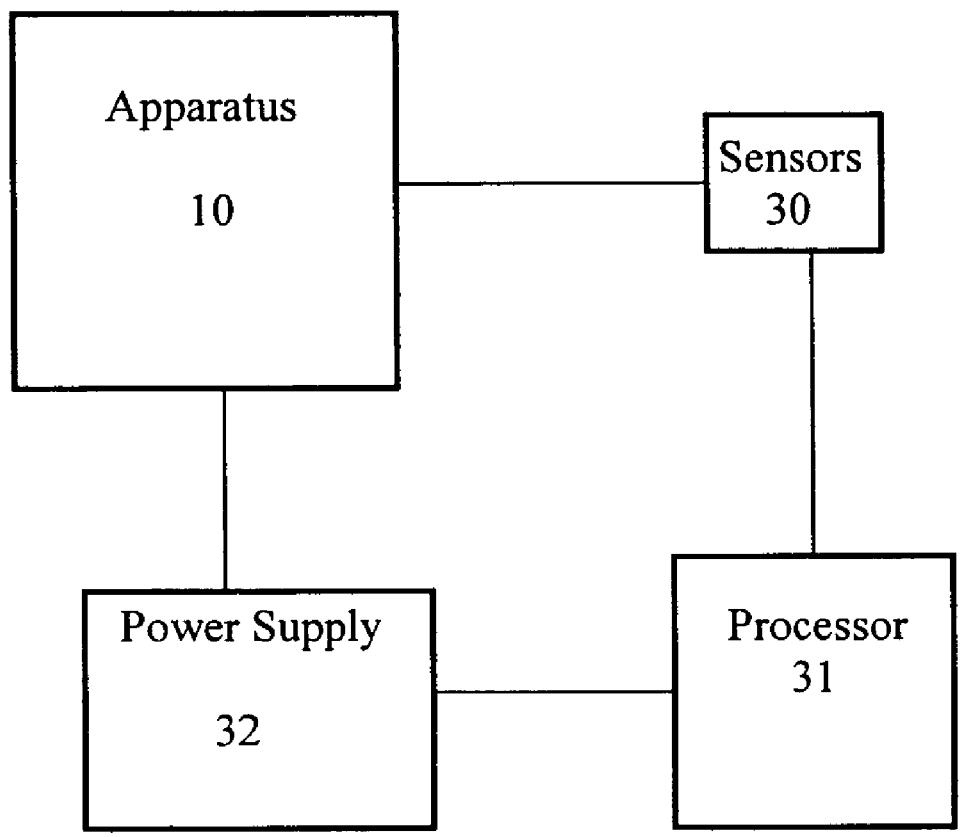
FIG. 3 illustrates a block diagram of a system according to one embodiment of the present invention.

The axial movement of the disk to contact the braking surface to provide haptic feedback through resistance to rotational motion may be governed by polarization of the electromagnet. Referring now to FIG. 3, which illustrates a block diagram of a system according to an embodiment of the present invention, polarization of the second cylinder 13 of the electromagnet core 12 and the first cylinder 11 of the braking surface of an apparatus 10 may occur by flowing current from a power source 32 through electric field coil 14 (not shown) in communication with the second cylinder 13 (not shown). The polarization of the second cylinder 13 of the electromagnet core 12 and the first cylinder 11 of the braking surface produces a magnetic field that draws the disk 15 in contact with the braking surface.

As illustrated in FIG. 3, the apparatus 10 is in communication with at least one sensor 30 operable to quantify the rotational position of the shaft 16 (not shown) connected to the disk 15 (not shown). The sensors 30 are additionally connected to a processor 31, such as a processor in a computer or dedicated controller. Moreover, the processor 31 is in communication with a power source 32. The power source 32 is also in communication with the electrical field coils 14 of the electromagnet core 12 of the apparatus 10.

Figure 4:
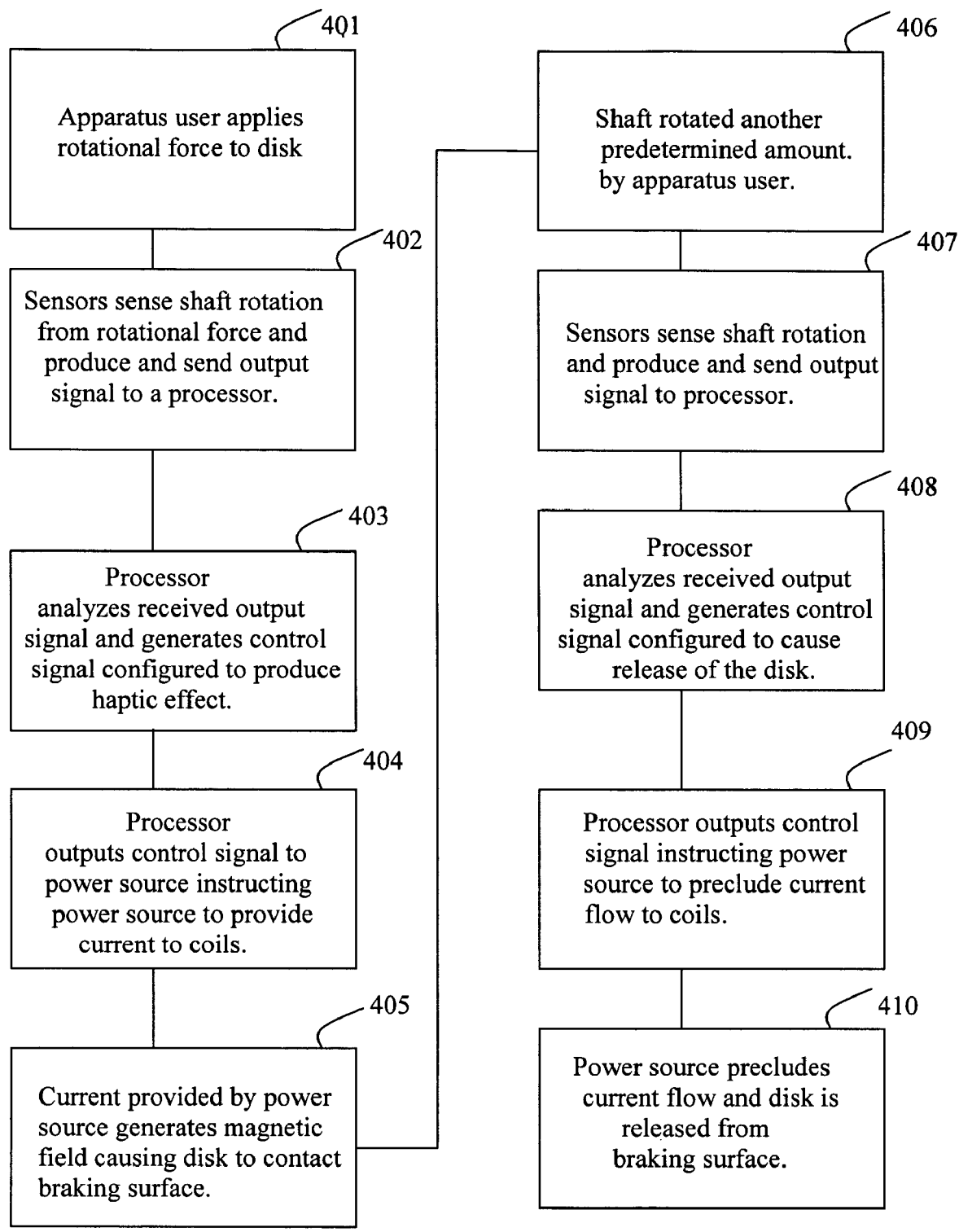
FIG. 4 is a flowchart illustrating a process for providing haptic feedback according to one embodiment of the present invention.

FIG. 4 is a flowchart that illustrates a process for providing haptic feedback according to one embodiment of the present invention. The shaft (16) of the apparatus 10 can be rotated by a user applying a rotational force to the disk (15) 401. When the shaft (16) of the apparatus (10) is rotated a first predetermined amount by an apparatus user, the sensors (30) are operable to produce and send an output signal to the processor (31) comprising data corresponding to the rotational position of the shaft (16) connected to the disk (15) 402. The first predetermined amount of rotation can be set to any desirable rotation amount measurable in degrees, radians and/or sensor counts.

The processor (31) is operable to receive and analyze the data contained in the output signal sent by the sensors (30). The processor is also operable to generate a control signal based at least on part on the data received from the sensors (30) wherein the control signal is configured to produce a haptic effect 403.

The processor (31) outputs the control signal to the power source (32), instructing the power source (32) to provide current to the electric field coils (14) in communication with the second cylinder (13) of the electromagnet core (12) 404. The current flowing from the power source (32) through the electric field coils (14) generates a magnetic field causing the disk (15) to contact the first cylinder (11) of the braking surface to provide a haptic effect comprising rotational resistance 405.

Still referring to FIG. 4, the shaft (16) connected to the disk (15) may be rotated a second predetermined amount 406. When the shaft (16) is rotated a second predetermined amount, the sensors (30) are operable to produce and send an output signal to the processor (31) comprising data corresponding to the second rotational position of the shaft (16) connected to the disk (15) 407. The second predetermined amount of rotation can be set to any desirable rotation amount measurable in degrees, radians and/or sensor counts.

The processor (31) is operable to receive and analyze the data contained in the output signal sent by the sensors (30) and subsequently generates another control signal configured to cause the electromagnet to release the disk (15) from the braking surface 408. The processor outputs this control signal instructing the power source (32) to preclude current flow to the electric field coils (14) in communication with the second cylinder (13) of the electromagnet core (12) 409. When current flow is removed, the second cylinder (13) of the electromagnet core (12) and the first cylinder (11) of the braking surface de-polarize, and the disk (15) is released from the braking surface 410.

In embodiments of the present invention, a sensor can be provided for each degree of freedom along which the shaft and/or disk can be moved. Alternatively, a single compound sensor can be used to sense position or movement in multiple degrees of freedom. In another embodiment, a sensor can be used to sense position or movement in one or two of a plurality of degrees of freedom. Sensors suitable for use in apparatus of the present invention can comprise analog and/or digital optical encoders, which sense the change in position of an object about a rotational axis and provide analog and/or digital signals indicative of the change in position. The optical encoder, for example, responds to a shaft's rotation by producing two-phase related signals in the rotary degree of freedom. Moreover, linear optical encoders similarly sense the change in position of an object along a linear degree of freedom and can produce two-phase related signals in response to movement of a linear shaft in the linear degree of freedom.

Processors suitable for use in embodiments of the present invention can comprise digital logic processors capable of processing input, executing algorithms, and generating output as necessary. Such processors may include a microprocessor, an ASIC, and state machines. Such processors include, or may be in communication with media, for example computer-readable media, which stores instructions that, when executed by the processor, cause the processor to perform the steps described therein.

Embodiments of computer-readable media include, but are not limited to, an electronic, optical, magnetic, or other storage or transmission device capable of providing a processor, such as a processor in communication with a touch-sensitive input or control device, with computer-readable instructions. Other examples of suitable media include, but are not limited to, a floppy disk, CD-ROM, magnetic disc, memory chip, ROM, RAM, an ASIC, a configured processor, all optical media, all magnetic tape or other magnetic media, or any other medium from which a computer processor can read instructions. Also, various forms of computer-readable media may transmit or carry instructions to a computer, including a router, private or public network, or other transmission device or channel both wired and wireless. The instructions may comprise code from any computer-programming language, including, for example, C, C++, C#, Visual Basic, Java, and JavaScript.

Figure 5:
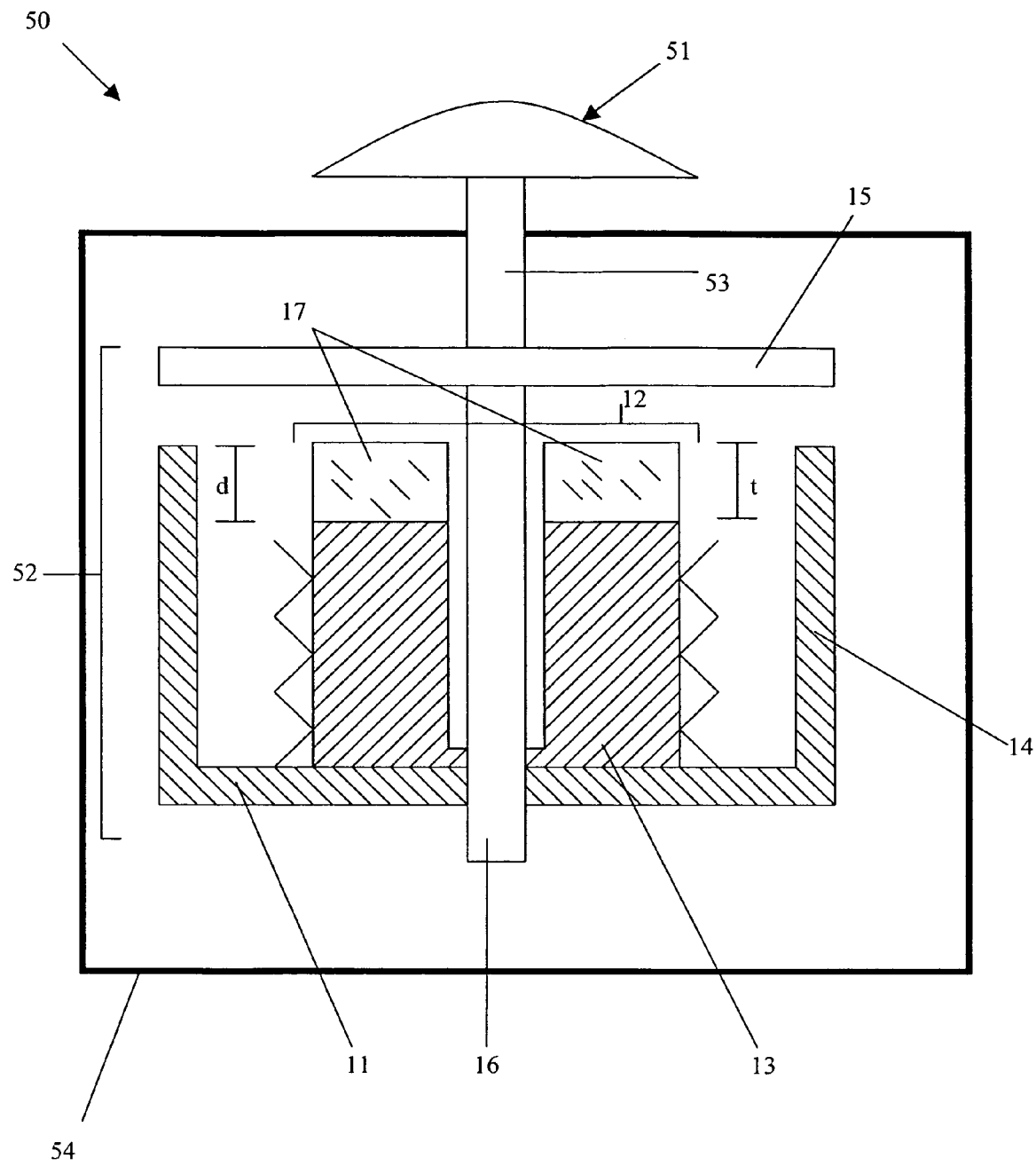
FIG. 5 illustrates a cross-sectional view of an apparatus according to one embodiment of the present invention.

In another embodiment, an apparatus of the present invention comprises a manipulandum and a resistive actuator coupled to the manipulandum. Referring now to FIG. 5 which is a cross-sectional view of an apparatus according to one embodiment of the present invention, the manipulandum of the apparatus 50 comprises a rotary handle 51 operable to be turned by an apparatus 50 user. In other embodiments, the manipulandum may comprise at least one of a scroll wheel, knob, and dial.

The resistive actuator 52 of the apparatus 50 may comprise, for example, the apparatus 10 previously described in FIGS. 1-2. The resistive actuator 52 comprises a braking surface and an electromagnet core 12 disposed in the braking surface. The braking surface comprises a first cylinder 11 having a first length and an open end and closed end. In other embodiments the first cylinder 11 of the braking surface can comprise other various geometries such as elliptical, square, rectangular, or polygonal.

The electromagnet core 12 comprises a second cylinder 13 having a second length, which is disposed in the first cylinder 11 of the braking surface. The electromagnet core further comprises electrical field coil 14 in communication with the second cylinder 13 to enable electromagnetic function. In other embodiments, the electrical field coil is not in communication with the second cylinder 13 and may reside in the annular space between the first 11 and second 13 cylinders. The length the first cylinder 11 is greater than the length of the second cylinder 13 such that the difference between the length of the first cylinder 11 and the length of the second cylinder 13 is equal to a value "d."

The resistive actuator 52 additionally comprises a disk 15 in communication with the manipulandum comprising a rotary handle 51. A first shaft 53 connects the disk 15 to the manipulandum. The disk is additionally connected to a second shaft 16. The second shaft 16 of the apparatus 50 passes through the second cylinder 13 of the electromagnet core 12 and the closed end of the first cylinder 11 of the braking surface. The disk 15, first shaft 53, and second shaft 16 are operable to move rotationally and/or axially. In one embodiment, an apparatus 50 user may rotate the rotary handle 51. The rotation of the rotary handle is translated to the disk 15 and second shaft 16 of the actuator through the first shaft 53. When rotated a predetermined amount by a user, the disk 15 may be operable to move in the axial direction and contact the top surface of the first cylinder 11 of the braking surface. In other embodiments, an annular shaft may pass outside of the electromagnet core 12, or the shaft may be positioned on one side of the electromagnet.

The contact of the disk 15 with the first cylinder 11 of the braking surface may provide haptic feedback through resistance to rotational motion. Moreover, when the disk 15 contacts the first cylinder 11 of the braking surface (not shown), a gap of distance "d" is formed between the top of the second cylinder 13 of the electromagnet core 12 and the bottom surface of the disk 15. The formation of the gap results from the length of the braking surface comprising the first cylinder 11 being greater than the length of the electromagnet core 12 comprising the second cylinder 13. In other embodiments, the disk 15 does not contact the first cylinder 11 of the braking surface in providing haptic feedback through resistance to rotational motion. In these embodiments, a magnetic force between the disk 15 and the electromagnet core 12 provides sufficient resistance to rotational motion.

A damping material 17 may be disposed in the gap (not shown) created by the contact of the disk 15 with the first cylinder 11 of the braking surface. The damping material 17 is operable to dissipate any noise resulting from the rotational operation of the apparatus 50. In the embodiment shown in FIG. 5, the damping material 17 is in communication with the top surface of the second cylinder 13 of the electromagnet core 12. In embodiments wherein the disk 15 does not make contact with the braking surface and resistance to rotational motion is provided by magnetic forces alone, a damping material may be disposed between the electromagnet core 12 and disk 15.

The damping material 17 in communication with the electromagnet core 12 in comprise a thickness "t" wherein the value of t is substantially equal to the value of d, the distance of the gap. As a result, the damping material in communication with the electromagnetic core 12 is operable to contact the bottom surface of the disk 15. In other embodiments the thickness of t may be less than the value for d. Moreover, damping materials suitable for use in the apparatus 50 are consistent with those previously described.

The apparatus 50 of FIG. 5 further comprises a housing 54 wherein the manipulandum and resistive actuator 52 are disposed within the housing 54. The housing 54 may comprise a cellular or mobile phone. In other embodiments, the housing 54 may comprise at least one of a Personal Digital Assistant ("PDA"), an MP3 player, a camcorder, a camera, and other suitable housing.

The operation of the apparatus 50 to provide haptic feedback to a user comprising resistance to rotation is substantially similar to the operation of the apparatus 10 previously described in FIGS. 3-4. In embodiments of the present invention, the axial movement of the disk to contact the braking surface to provide haptic feedback through resistance to rotational motion may be governed by polarization of the electromagnet. Polarization of the second cylinder 13 of the electromagnet core 12 and the first cylinder 11 of the braking surface may occur by flowing current from a power source through electric field coil 14 in communication with the second cylinder 13. The polarization of the second cylinder 13 of the electromagnet core and the first cylinder of the braking surface 11 produces a magnetic field that draws the disk 15 in contact with the braking surface.

The apparatus 50 is in communication with at least one sensor for quantifying the rotational position of the shaft 16 connected to the disk 15. The sensors are additionally connected to a processor such as a processor in a computer or dedicated controller. When the shaft 16 of the apparatus 50 is rotated a first predetermined amount by a user turning the rotary handle 51 of the manipulandum, the sensors are operable to produce and send a output signal to the processor comprising data corresponding to the rotational position of the shaft 16 connected to the disk 15. The first predetermined amount of rotation can be set to any desirable amount of rotation measurable in degrees, radians, and/or sensor counts.

The processor is operable to receive and analyze the data contained in the output signal sent by the sensors. The processor is additionally operable to generate a control signal based at least in part on the data received from the sensors wherein the control signal is configured to produce a haptic effect. The processor outputs the control signal to the power source instructing the power source to provide current to the electric field coils 14 in communication with the second cylinder 13 of the electromagnet core 12. The current flowing from the power source through the electric field coils 14 generates a magnetic field causing the disk 15 to contact the first cylinder 11 of the braking surface to provide a haptic effect comprising rotational resistance.

The shaft 16 connected to the disk 15 may be rotated a second predetermined amount by a user turning the rotary handle 51. The second predetermined amount of rotation can be set to any desirable amount of rotation measurable in degrees, radians, and/or sensor counts. When the shaft 16 is rotated a second predetermined amount, the sensors are operable to produce and send an output signal to the processor comprising data corresponding to the second rotational position of the shaft 16 connected to the disk 15.

The processor is operable to receive and analyze the data contained in the output signal sent by the sensors and subsequently generates another control signal configured to cause the electromagnet to release the disk 15 from the braking surface. The processor outputs this control signal instructing the power source to preclude current flow to the electric field coils 14 in communication with the second cylinder 13 of the electromagnet core 12. When current flow is removed, the second cylinder of the electromagnet core 12 and the first cylinder 11 of the braking surface de-polarize, and the disk 15 is released from the braking surface.

In embodiments of the present invention, a sensor can be provided for each degree of freedom along which the shaft and/or disk can be moved. Alternatively, a single compound sensor can be, used to sense position or movement in multiple degrees of freedom. In another embodiment, a sensor can be used to sense position or movement in one or two of a plurality of degrees of freedom. Sensors and processors suitable for use with the apparatus 50 can comprise those previously described in this present document.

In another embodiment of the present invention, a method comprises providing a braking surface, providing an electromagnet core disposed in the braking surface, providing a disk operable to contact the braking surface such that a gap is defined between the disk and the electromagnet core, and providing a damping material disposed within the gap. The present embodiment may further comprise providing a processor operable to generate a control signal wherein the control signal is configured to cause the electromagnet core to generate a haptic effect.

In another embodiment of the present invention, a method comprises providing a manipulandum and providing a resistive actuator coupled to the manipulandum, the resistive actuator comprising a braking surface, an electromagnet core disposed in the braking surface, a disk operable to contact the braking surface such that a gap is defined between the disk and the electromagnet core, and a damping material disposed in the gap. The present embodiment may further comprise providing a processor operable to generate a control signal wherein the control signal is configured to cause the electromagnet core to generate a haptic effect.

For example, a PDA manufacturer may provide the components of a magnetic actuator according to one embodiment of the present invention to enable haptic feedback in a PDA. Some of the various components may be supplied by sub-component manufacturers who then supply the components to the PDA or other device manufacture for incorporation into a device. Alternatively, the magnetic actuator may be supplied as a complete sub-component.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

What is claimed is:

1. An apparatus comprising:
a braking surface;
an electromagnet core completely disposed in the braking surface;
a disk operable to contact the braking surface such that a gap is defined between the disk and the electromagnet core; and
a damping material disposed within the gap.

2. The apparatus of claim 1, wherein the braking surface comprises at least one of a cylinder, ovoid, and polygon.

3. The apparatus of claim 2, wherein the braking surface further comprises a first length and the electromagnet core comprises a second length, the first length greater than the second length.

4. The apparatus of claim 1, wherein the damping material disposed within the gap is in communication with the electromagnet core and the disk.

5. The apparatus of claim 1, further comprising a processor operable to generate a control signal wherein the control signal is configured to produce a haptic effect.

6. The apparatus of claim 1, wherein the damping material comprises a damping grease.

7. The apparatus of claim 1, wherein the damping material comprises a grease, a silicone gel, a compliant pad, or a fibrous washer in conjunction with a grease or silicone gel.

8. The apparatus of claim 1, wherein the disk is configured to move axially and rotationally.

9. The apparatus of claim 1, wherein the disk comprises a manipulandum.

10. An apparatus comprising:
a manipulandum; and a resistive actuator coupled to the manipulandum, the resistive actuator comprising:
  a braking surface;
  an electromagnet core completely disposed in the braking surface;
  a disk operable to contact the braking surface such that a gap is defined between the disk and the electromagnet core; and
  a damping material disposed within the gap.

11. The apparatus of claim 10, wherein the braking surface comprises at least one of a cylinder, ovoid, and polygon.

12. The apparatus of claim 11, wherein the braking surface further comprises a first length and the electromagnet core comprises a second length, the first length greater than the second length.

13. The apparatus of claim 10 further comprising a housing, wherein the manipulandum and the resistive actuator are disposed within the housing.

14. The apparatus of claim 13, wherein the housing comprises at least one of a cellular phone, PDA, and camera.

15. The apparatus of claim 10, wherein the damping material disposed within the gap is in communication with the electromagnet core and the disk.

16. The apparatus of claim 10, further comprising a processor operable to generate a control signal wherein the control signal is configured to produce a haptic effect.

17. The apparatus of claim 10, wherein the damping material comprises damping grease.

18. The apparatus of claim 10, wherein the damping material comprises a grease, a silicone gel, a compliant pad, or a fibrous washer in conjunction with a grease or silicone gel.

19. The apparatus of claim 10, wherein the disk is configured to move axially and rotationally.

20. The apparatus of claim 10, wherein the manipulandum comprises at least one of a scroll wheel, knob, dial, and rotary handle.

21. A method comprising:
  providing a braking surface;
  providing an electromagnet core completely disposed in the braking surface;
  providing a disk operable to contact the braking surface such that a gap is defined between the disk and the electromagnet core; and
  providing a damping material disposed within the gap.

22. The method of claim 21 further comprising providing a processor operable to generate a control signal wherein the control signal is configured to produce a haptic effect.

23. A method comprising:
  providing a manipulandum; and
  providing a resistive actuator coupled to the manipulandum, the resistive actuator comprising:
    an braking surface;
    an electromagnet core completely disposed in the braking surface;
    a disk operable to contact the braking surface such that a gap is defined between the disk and the electromagnet core; and
    a damping material disposed with the gap.

24. The method of claim 23 further comprising providing a processor operable to generate a control signal wherein the control signal is configured to produce a haptic effect.

25. An apparatus comprising:
  a manipulandum; and
  a resistive actuator coupled to the manipulandum, the resistive actuator comprising:
    a cylindrical braking surface having a braking surface length, a cylindrical electromagnet core completely disposed in the cylindrical braking surface, the cylindrical electromagnetic core having an electromagnetic core length less than the braking surface length,
    a disk operable to contact the cylindrical braking surface thereby defining a gap between the disk and the cylindrical electromagnet core, and
    a damping material, disposed within the gap, the damping material comprising a damping grease; and
    a processor configured to generate a control signal wherein the control signal is configured to produce a haptic effect.

* * * * *